US006406158B1

(12) United States Patent
Ohkawa

(10) Patent No.: US 6,406,158 B1
(45) Date of Patent: Jun. 18, 2002

(54) SURFACE LIGHT SOURCE DEVICE OF SIDE LIGHT TYPE

(75) Inventor: Shingo Ohkawa, Koshigaya (JP)

(73) Assignees: Enplas Corporation, Kawaguchi; Yasuhiro Koike, Yokohama, both of (JP)

( * ) Notice: Subject to any disclaimer, the term of this patent is extended or adjusted under 35 U.S.C. 154(b) by 0 days.

(21) Appl. No.: 09/131,694

(22) Filed: Aug. 10, 1998

(30) Foreign Application Priority Data

Aug. 11, 1997 (JP) .............................................. 9-228853

(51) Int. Cl.[7] .............................................. F21V 7/04
(52) U.S. Cl. ............................ 362/31; 362/26; 362/330; 362/339
(58) Field of Search ......................... 362/31, 330, 339, 362/26, 309, 327, 329; 385/146

(56) References Cited

U.S. PATENT DOCUMENTS

| 5,184,888 | A | * | 2/1993 | Sakuma et al. | ................ | 362/31 |
| 5,339,179 | A | * | 8/1994 | Rudisill et al. | ................ | 362/31 |
| 5,854,872 | A | * | 12/1998 | Tai | .............................. | 362/309 |
| 6,155,692 | A | * | 12/2000 | Ohkawa | ........................ | 362/31 |

FOREIGN PATENT DOCUMENTS

| CN | 230570 | 9/1994 | | |
| CN | 270978 | 2/1996 | | |
| WO | 094023244 | * | 10/1996 | .................. 362/31 |

* cited by examiner

*Primary Examiner*—Thomas M. Sember
(74) *Attorney, Agent, or Firm*—Staas & Halsey LLP

(57) ABSTRACT

Illuminating light, supplied from a primary light source of a surface light source device of side light type, passes through an incidence surface (12A) and enters a wedge-shaped scattering guide plate (12). Inside the guide plate (12), the illuminating light propagates toward the end while being repeatedly reflected between a back face (12B) and an emission surface (12C). During this process, the illuminating light receives scattering action of particles or the like in the guide plate (12). The emission surface (12C) provides a prism surface. The back face (12B) comprises a plurality of projections in a belt region (AR1) along an edge (EL). The projections run generally parallel to the edge (EL) and each has a pair of slopes (12G and 12H). The height of the projections (that is, depth of the troughs) or the inclination of the slopes (12G and 12H) preferably decrease according to distance from the edge (EL). The projections diffuse light propagation direction, thereby preventing generation of bright lines around the edge (EU) of the emission surface.

4 Claims, 6 Drawing Sheets

SURFACE LIGHT SOURCE DEVICE OF SIDE LIGHT TYPE

FIELD OF INVENTION

The present invention relates to a surface light source device of side light type, and more particularly to a technique for improving quality of illuminating light in the device. The surface light source device according to the present invention is applied to, for instance, backlighting of a liquid crystal display.

RELATED ART

It is well known that a surface light source device of side light type is applied to backlighting of a liquid crystal display. The surface light source device supplies illuminating light from the back face of a liquid crystal panel. This arrangement is suitable for making the overall shape of the display thinner.

In general, a surface light source device of side light type uses a rod-shaped light source, such as a cold cathode tube, as a primary light source. The rod-shaped light source is provided on a side of a guide plate (plate-like guide body). Illuminating light, emitted from the primary light source, is guided inside the guide plate through an incidence end face (hereinafter "incidence surface") of the guide plate. Having been guided inside, the illuminating light is propagated in the guide plate, whereby illuminating light output is obtained from a major surface of the guide plate.

A plate of generally uniform thickness and a plate of gradient thickness are known as types of plate which can be used as the guide plate. In general, the latter has higher illuminating light output efficiency than the former.

FIG. 8 is an exploded perspective view of a surface light source device of side light type using the latter type of guide plate. FIG. 9 is a cross-sectional view taken along the line A—A of FIG. 8. As shown in FIG. 8 and FIG. 9, the surface light source device of side light type 1 comprises a guide plate 2, a primary light source 3 which is provided along one side of the guide plate 2, a reflection sheet 4, a prism sheet 5 and a diffusion sheet 6.

The reflection sheet 4, the guide plate 2, the prism sheet 5 and the diffusion sheet 6 are laminatedly arranged. The guide plate 2 is a plate-like guide member which is bar-shaped in cross-section. In this example, the guide plate 2 comprises a scattering guide body. The scattering guide body comprises, for instance, a matrix of PMMA (polymethyl-methacrylate) and a great number of light-permeable particles which are uniformly dispersed therein. The refractive index of these particles is different from that of the matrix. Such a guide plate is called a scattering guide plate.

The guide plate (light-scattering guide plate) 2 has major surfaces providing an emission surface 2C and a back face 2B. The emission surface 2C provides a prism surface as a light-controlling surface. This prism surface comprises a great number of rows of projections. As shown in partial enlargement at the section indicated by reference symbol B, the projections, each having slopes 2E and 2F, run almost perpendicular to the end surface (incidence surface) 2A and are triangular in cross-section. As is well known, this type of prism surface functions by gathering light propagation direction toward the frontal direction in a surface parallel to the incidence surface 2A.

A guide plate comprising transparent acrylic resin may, for instance, be used instead of the scattering guide plate 2.

When a transparent guide plate is used, a diffusion surface is conventionally provided on the back face 2B.

The primary light source 3 comprises a bar-shaped cold cathode tube (flourescent lamp) 7 and a reflector 8, generally semicircular in cross-section, which is provided to the back face of the cold cathode tube 7. Illuminating light is supplied through the opening of the reflector 8 toward the side end face of the guide plate 2. A sheet-like regular reflection member comprising metal foil or the like, or a sheet-like diffused reflection member comprising white PET film or the like, is used as the reflection sheet 4.

The prism sheet 5 is a light-permeable sheet-like member comprising, for instance, polycarbonate. The prism sheet 5 is normally provided with the prism surface facing the scattering guide plate 2.

Each prism surface comprises a great number of projections which run parallel to each other. As shown in partial enlargement in the section indicated by reference symbol C, each projection has a slope 5A and a slope 5B. Then, the prism sheet 5 is aligned so that these projections run almost parallel to the end surface (incidence surface) 2A. As is well known, the prism sheet 5 aligned in this manner corrects the direction of light propagation to the frontal direction in a surface which is perpendicular to the incidence surface 2A.

The diffusion sheet 6, provided on the outer side of the prism sheet 5, diffuses light propagation direction. In general, the diffusion power of the diffusion sheet 6 is weak and illuminating light is scattered weakly in order to prevent interference fringes from occurring.

Illuminating light L from the primary light source 3 is led through the incidence surface 2A into the guide plate 2. Inside the guide plate 2, the illuminating light L propagates toward the end while being repeatedly reflected between the back face 2B and the emission surface 2C. During this process, the illuminating light L is subjected to scattering action of the particles inside the guide plate 2. A portion of light leaks from the back face, but the mechanism of sheet 4 effectively returns this leaked light into the guide plate 2. When the reflection sheet 4 comprises a diffused reflection member, diffused reflection action also takes effect.

As can be understood from FIG. 9, since the back face 2B is inclined with respect to the emission surface 2C, the angle of incidence of the illuminating light to the emission surface 2C gradually decreases with each reflection of illuminating light L from the slope 2B. This reduction in the angle of incidence increases the incident components which are below the critical angle to the emission surface 2C. This facilitates emission from the emission surface 2C as the illuminating light nears the end. Consequently, reduced brightness in regions which are far from the primary light source 3 is prevented.

The illuminating light L output from the emission surface 2C has properties of scattered light because it has experienced scattering by light-permeable particles, or further diffused reflection by the reflection sheet 4. However, as is well known, the priority propagation direction (the main direction of propagation) inclines in the end direction (opposite direction to the primary light source 3) with respect to the frontal direction. The prism sheet 5 corrects such directivity and corrects the priority propagation direction to the frontal direction in a surface perpendicular to the incidence surface 2A. The diffusion sheet 6 weakly scatters the illuminating light, eliminating cause of minute brightness inconsistencies such as interference fringes.

In general, such a surface light source device 1 using the bar-shaped guide plate 2 and the prism sheet 5 emits light in the frontal direction more efficiently than a surface light source device of the same type using a guide plate of generally even thickness.

However, in the conventional device described above, undesirable bright lines are generated along both side edges on the emission surface 2C (left and right belt regions as viewed from the primary light source 3). These bright lines tend to be especially noticeable when the emission surface 2C comprises a light control surface (a great number of projections) as described above. The bright lines comprise localized fine belts of high brightness, reducing the evenness of light output.

Such a tendency of bright lines might be lessened by using a flat emission surface having no projection, but further restriction is desirable. Furthermore, the guide plate 2 would lose its function of correcting directivity in a surface parallel to the incidence surface 2A. Cause of bright lines, which occur along both side edges on the emission surface 2C, is thought to be that illuminating light illuminates these side edges, undergoes one or more internal reflections and is emitted locally from the emission surface 2C.

The projections on the emission surface 2C relax the critical angle conditions for light escape and consequently facilitate local emission. Such a phenomenon is known as "(side edge) over-reflection". There is a demand to remove such side edge over-reflection in order to improve the quality of light output in a surface light source device of side light type.

OBJECT AND SUMMARY OF INVENTION

The present invention aims to solve the abovementioned problems of the conventional surface light source device of side light type. It is an object of the present invention to prevent generation of bright lines along side edges of the emission surface in a surface light source device of side light type. Described from another point of view, the present invention aims to enable generation of bright lines along side edges of the emission surface to be prevented even when the surface light source device of said type employs a guide plate having an emission surface which comprises a light control surface.

The present invention is applied to a surface light source device of side light type comprising a primary light source and a guide plate, having an emission surface and a back face as major surfaces thereof, wherein light is supplied from an incidence end surface of the guide plate, and an edge is formed by a side face, adjoining the incidence end surface, meeting with a back face.

In compliance with the features of the present invention, multiple projections are provided on the back face in a region along the edge. These projections run generally parallel to the edge. A great number of projections, running generally perpendicular to the incidence end surface, may be provided on the emission surface.

In compliance with the preferred embodiment, projections provided on the back face decrease in height as their distance from the edge increases. Furthermore, in compliance with another preferred embodiment, the projections, provided on the back face, decrease in sharpness as their distance from the edge increases.

The projections, provided on the back face of the guide plate in a region along the edge, diversify and spread the propagation direction of illuminating light, arriving from the emission surface of the guide plate and the side face edge, and light arriving from a frame, which forms a peripheral member. Consequently, light arising from such illumination of the edge or the frame is prevented from being strongly emitted locally from the emission surface thereafter. As a result, generation of bright lines along the side edges of the emission surface is prevented. Bright lines of this type are especially liable to occur when a prism surface is provided on the emission surface, but they can be effectively controlled by the application of the present invention.

EMBODIMENT (1) Embodiment

Figure 1:
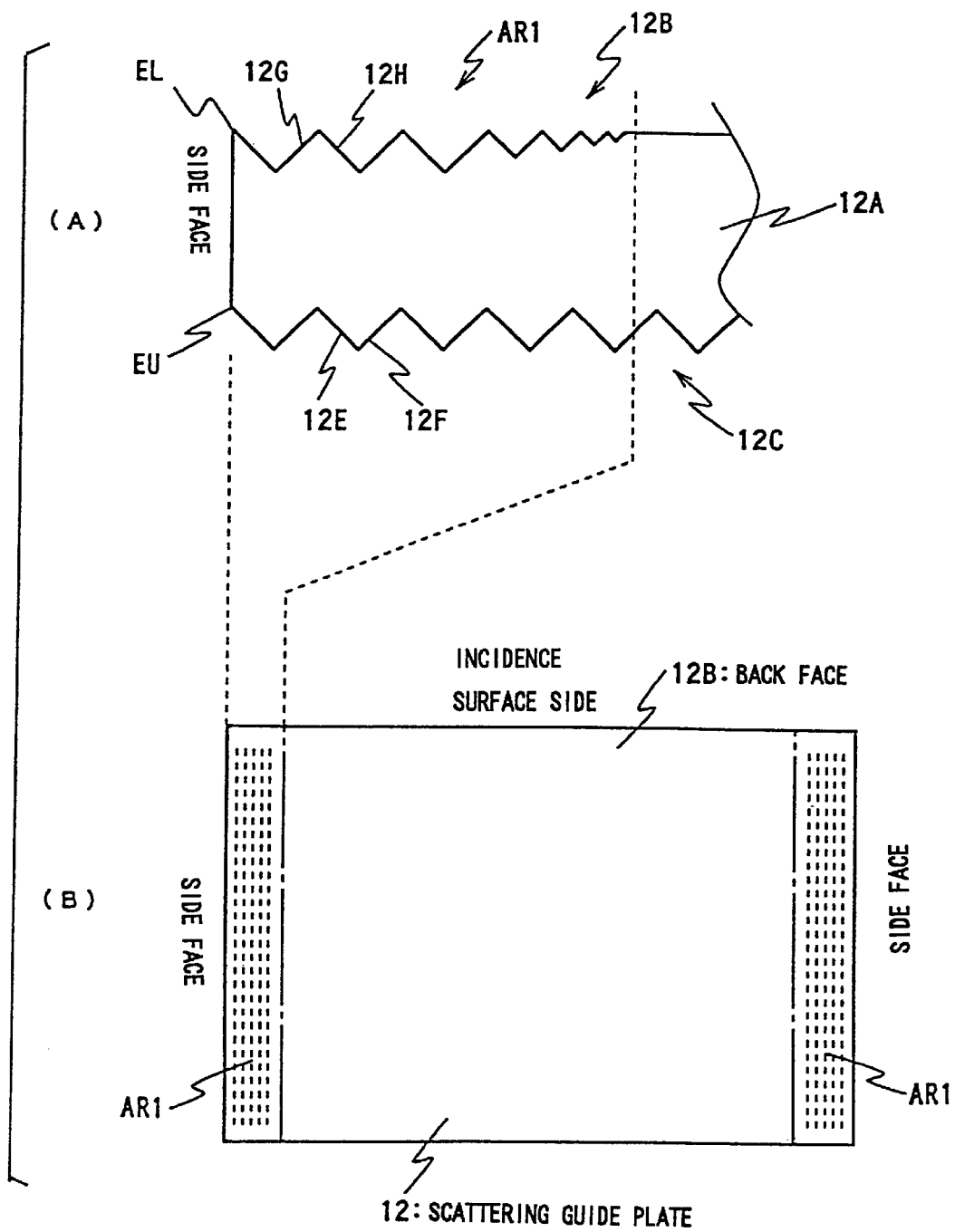
FIG. 1(A) is a partially sectional view of a scattering guide plate used in an embodiment of the present invention, and FIG. 1(B), a plan view of the same.

FIG. 1 illustrates features of a scattering guide plate 12 used in the present invention, showing a plan view (A) of under surface 12B and a side view (B) from an incidence surface (incidence end surface) 12A. The surface light source device of side light type according to the present invention replaces the guide plate 2 of the device shown in FIG. 8 and FIG. 9 with a new scattering guide plate 12.

Figure 8:
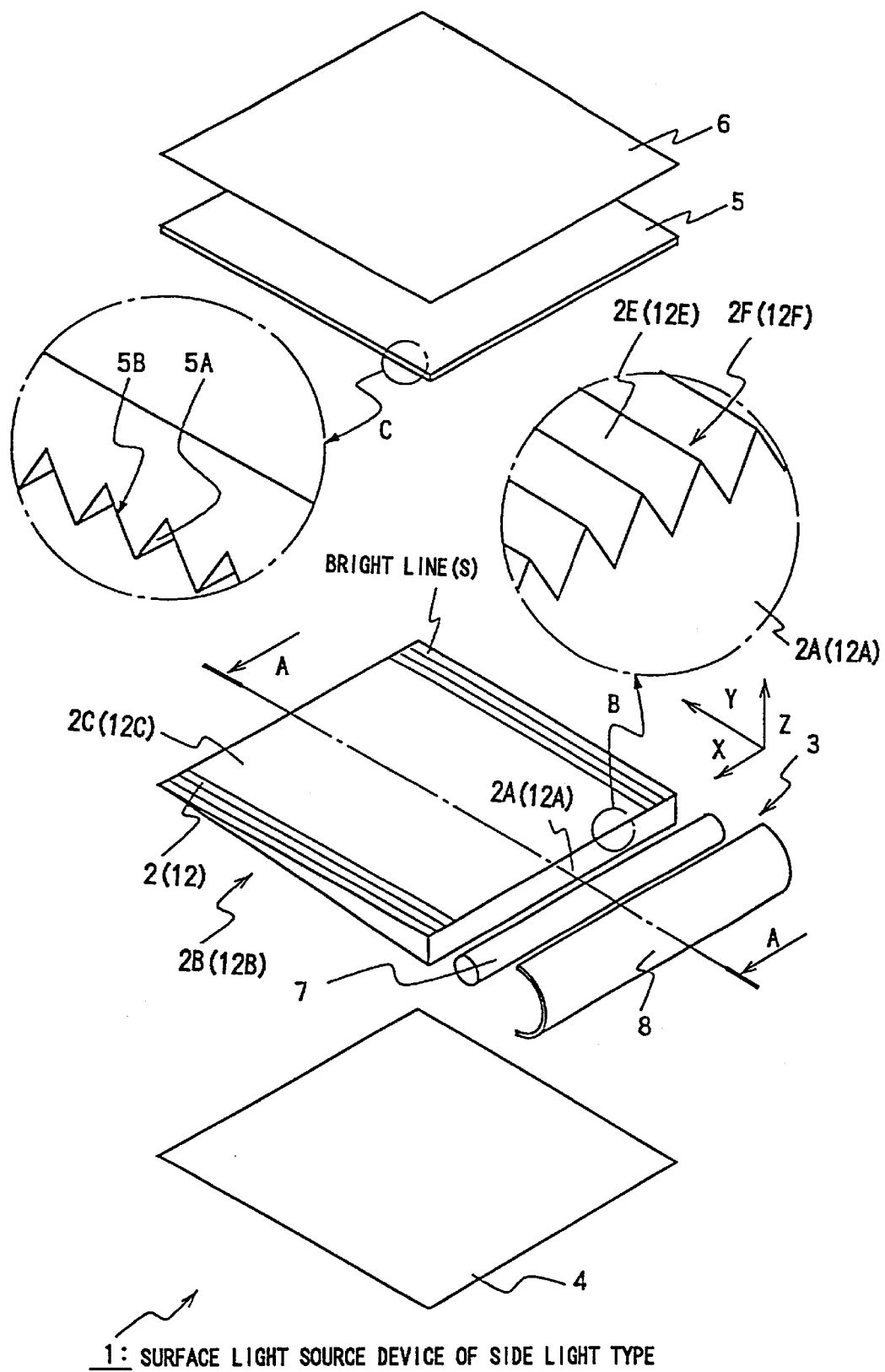
FIG. 8 is an exploded perspective view of a general arrangement of a surface light source device of side light type.
Figure 9:
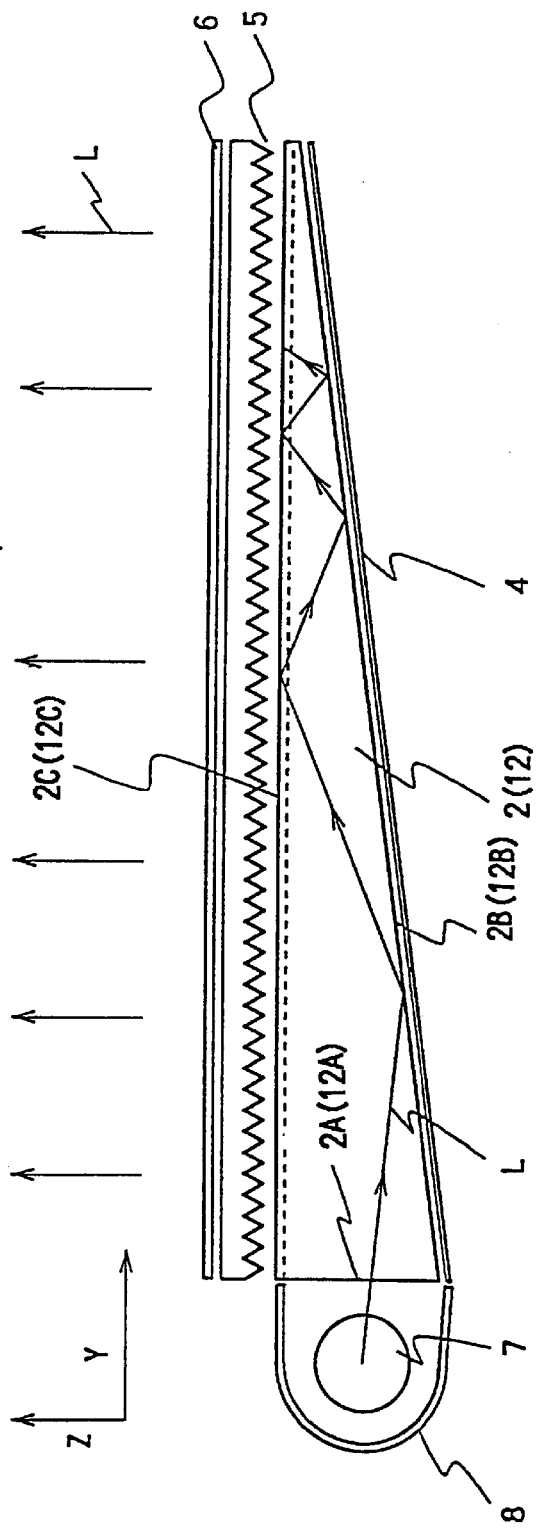
FIG. 9 is a cross-sectional view taken along line A—A of FIG. 8.

The following explanation centers on structure and effect of the scattering guide plate 12, with reference to FIG. 8 and FIG. 9 as necessary. In FIG. 8 and FIG. 9, reference symbols relating to the scattering guide plate 12 are indicated in brackets.

As shown in FIG. 1, the scattering guide plate 12 (hereinafter, guide plate 12), which is generally wedge-shaped, preferably comprise the same type of material as the scattering guide body 2 (see FIG. 8 and FIG. 9). The matrix comprises, for instance, polymethyl-methacrylate (PMMA) and a great number of light-permeable particles, which have a different refractive index to the matrix, are uniformly dispersed therein.

Light supplied from the primary light source 3 passes through a thick end portion (incidence surface) 12A. The guide plate 12 comprises major surfaces providing an emission surface 12C and a back face 12B. The emission surface 12C provides a prism surface as a light control surface. This prism surface comprises a great number of rows of projections.

In FIG. 1, reference symbols EL and EU represent edges corresponding respectively to the line of intersection between the long triangular side face and the back face 12B, and the line of intersection between the same side face and the emission surface 12C. The projections, which have slopes 12E and 12F, run generally perpendicular to the incidence surface 12A and are triangular in cross-section. As in the case of the guide plate 2, this prism surface serves to gather the directions of light propagation to the frontal direction in a surface parallel to the incidence surface 12A.

In compliance with the features of the present invention, the back face 12B of the guide plate 12 comprises multiple projections provided in a belt region AR1 along the edge EL. These projections run generally parallel to the edge EL and each has a pair of slopes 12G and 12H. The projections are triangular when viewed in cross-section. The height of the projections (that is, depth of the troughs) preferably decrease as distance the edge EL increases. This prevents sharp changes in properties at the boundary between the belt regions AR1 and the other region (that is, the region including the center portion). As a result, the boundary is less easily observed, thereby preventing deterioration in the quality of illuminating light.

The range (width) of the belt regions AR1 preferably be set so as to include all points (on the back face 12B) which satisfy escape conditions relating to the critical angle in a case when illuminating light L, illuminated onto the upper and lower edges EL and EU and from there internally reflected in the back face 12B, is thereafter internally reflected to the emission surface 12C (assuming a case where the back face 12B was a flat surface).

The angle of the slopes 12G and 12H of the projections is, for instance, 100 degrees. The repeat pitch (direction parallel to the incidence surface 12A) is, for instance, generally 50 μm.

Having replaced the guide plate 2 of FIG. 8 and FIG. 9 with the guide plate 12 explained above, the behaviour of light in the present embodiment is given below.

As shown in FIG. 1, FIG. 8 and FIG. 9, illuminating light L supplied from a fluorescent lamp 7 passes through the incidence surface 12A and is led into the guide plate 12. Inside the guide plate 12, the illuminating light L propagates toward the end while being repeatedly reflected between the back face 12B and the emission surface 12C. During this time, the illuminating light L receives scattering action of the particles inside the guide plate 12. A portion of light leaks from the back face, but the reflection sheet 4 effectively returns this leaked light into the guide plate 12.

Since the back face 12B inclines with respect to the emission surface 12C, incidence angle of the illuminating light L to the emission surface 12C gradually decreases each time the illuminating light L is reflected off the back face 12B. This decrease in incidence angle increases the amount of incident components which are below the critical angle with the emission surface 12C, thereby facilitating emission. Consequently, reduction of brightness in regions far from the primary light source 3 is prevented.

Illuminating light output from the emission surface 12C has properties of scattered light because it has experienced scattering by light-permeable particles, or further diffused reflection by the reflection sheet 4. However, the priority propagation direction inclines toward the end direction with respect to the frontal direction. The prism sheet 5 corrects such directivity and revises the priority propagation direction to the frontal direction in a surface perpendicular to the incidence surface 12A. The diffusion sheet 6 weakly scatters the illuminating light, eliminating cause of minute brightness inconsistencies such as interference fringes. Correction of directivity in a surface parallel to the incidence surface 12A is achieved by the projections on the emission surface (light control surface) 12C.

Light behaviour so far explained is basically the same as in the conventional device of same type. The present invention differs from the conventional technology by providing projections in the belt region AR1. These projections influence the behaviour of light bearing on the edges EL and EU, preventing the generation of the above bright lines on the emission surface 12C.

After propagating through the guide plate 12, a portion of the illuminating light escapes to the outside of the guide plate 12 from the sides (between edges EL and EU) and their vicinity.

A peripheral member (not shown in the diagram), such as a frame member or a housing member, is provided around the guide plate 12 to hold all the elements contained therein. The escaping light illuminates the peripheral member, is reflected off it, and next brightly illuminates the edges EL and EU. Bright lines are generated when light resulting from these illuminations is locally output from the emission surface 12C. Such local output from the emission surface 12C arises after the illuminating light has undergone a number of repeated reflections between the emission surface 12C and the back face 12B.

Figure 2:
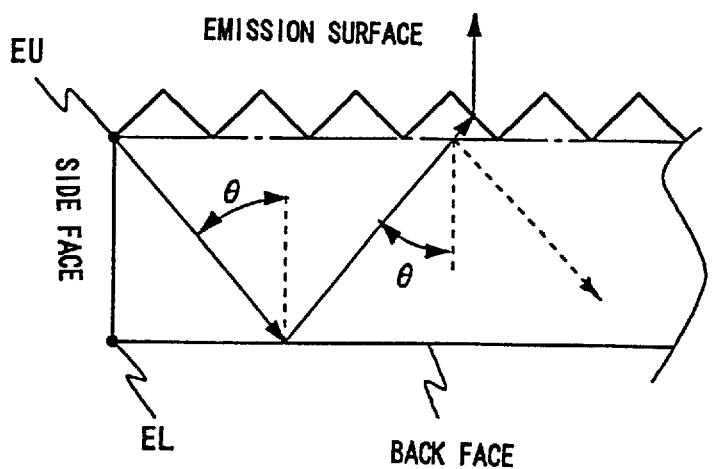
FIG. 2 is a partially sectional view illustrating a mechanism of generating bright lines around a side face in order to understand features of the present invention.

FIG. 2 illustrates the behaviour of light after illumination of the upper edge EU. Light from the edge EU propagates through the inside of the guide plate 12, is reflected off the back face and internally enters the emission surface. Let us assume that projections are not formed in the region AR1 (equivalent to the conventional technology) and that the back face is flat. If the emission surface is flat (indicated by a dash and dotted line), angle θ remains unchanged and becomes the incident angle to the emission surface. Therefore, as long as the angle θ does not drop below the critical angle (e.g. generally 43 degrees in the case of a PMMA matrix), no local emission occurs and total reflection is achieved (broken line).

However, when the emission surface comprises a prism surface (solid line), the angle of internal incidence to the prism surface is less than θ. As a result, conditions for total reflection are easily broken, causing local emission as indicated by a solid line.

Figure 3:
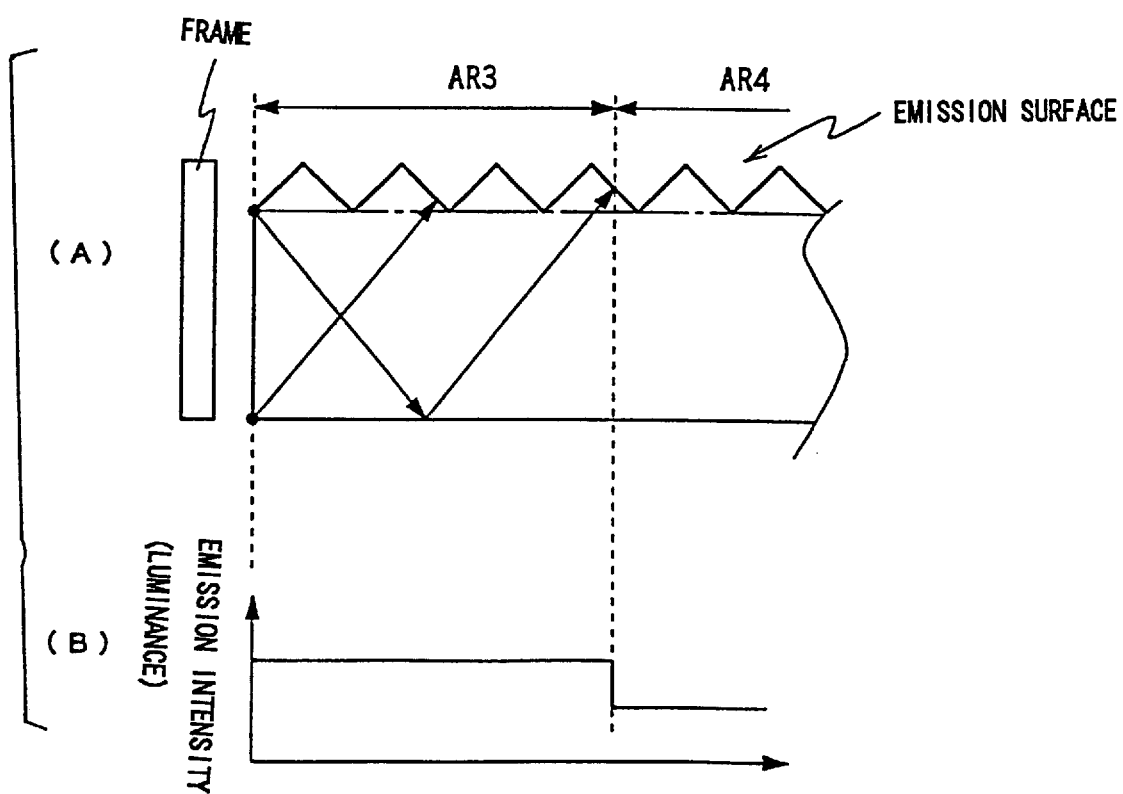
FIG. 3 is a partially sectional view illustrating emission intensity around a side face in order to understand features of the present invention.

FIG. 3 shows results obtained after further examining the behaviour of illuminating light arising from illumination of the frame, and investigating variations of emission according to distance from the side face of the edge frame. Note that, as above, FIG. 3 assumes that no projections are formed on the back face.

In FIG. 3, a graph (B) illustrating intensity variation is depicted according to the same partial cross-section (A) as FIG. 2. As shown in FIG. 3, it was discovered that a range AR3, which is defined by the critical angle of internal incidence to the emission surface (dependent on the relation of air to the refractive index of the guide plate), exhibits greater emission intensity than an inner side region AR4; in addition, bright lines accumulate more in the range AR3 than in the region AR4, lowering the quality of the illuminating light output.

Increased emission intensity in this side face region AR3 is mainly due to illumination of light from the frame. It was also learned that this increase of intensity becomes more noticeable when a prism surface is formed on the emission surface 12C. Note that, for diagrammatic purposes, in FIG. 2, FIG. 3, and FIG. 4 and FIG. 5 described later, the critical angle is depicted as greater than the angle represented by the solid line.

Figure 4:
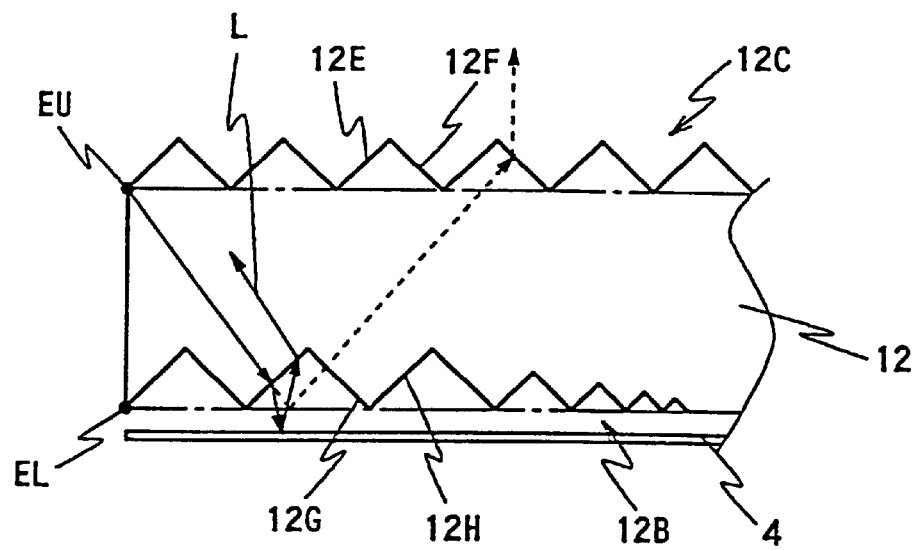
FIG. 4 is a partially sectional view illustrating a function for preventing bright lines of the scattering guide plate shown in FIG. 1.

In the present embodiment, projections are provided in region AR1 to deter such tendencies and consequently prevent bright lines. In FIG. 4, which explains this action, projections, formed along the side face in region AR1 of the back face 12B, are represented by a solid line. In contrast, the dash and dotted line represents the back face in a case when it is assumed that no projections are formed, and the back face is therefore flat (as in the conventional technology).

If the back face 12B were flat, many of the components of light arriving from the edge EU would be reflected off the back face 12B and the reflection sheet 4 and would proceed toward the emission surface 12C. This light is easily emitted from the emission surface 12C, comprising a prism surface. However, when projections (slopes 12G and 12H) exist as in the present embodiment, light path changes.

That is, many of light components arriving from the edge EU pass through the back face 12B and reflect off the reflection sheet 4. From the back face 12B, the reflected light then proceeds once again through the guide plate 12. Light path during this process is bent due to refraction action of the slope 12H. In fact, there is a spread in the path of illuminating light arriving from the edge EU. When several light paths were examined, it was found that diffusion into a great number of directions occurred in accordance with incidence angle to the slopes 12G and 12H of the back face 12B. If the back face 12B were flat, we could not expect such diffusion into a great number of directions.

Utilizing this type of diffusion effect, it is possible to avoid local emission from the emission surface 12C of light illuminating the upper edge EU. As a result, the possibility of bright lines being observed is noticeably reduced. According to the results of these tests, bright lines arising from the upper edge EU were restricted to the point where they were barely observed.

Figure 5:
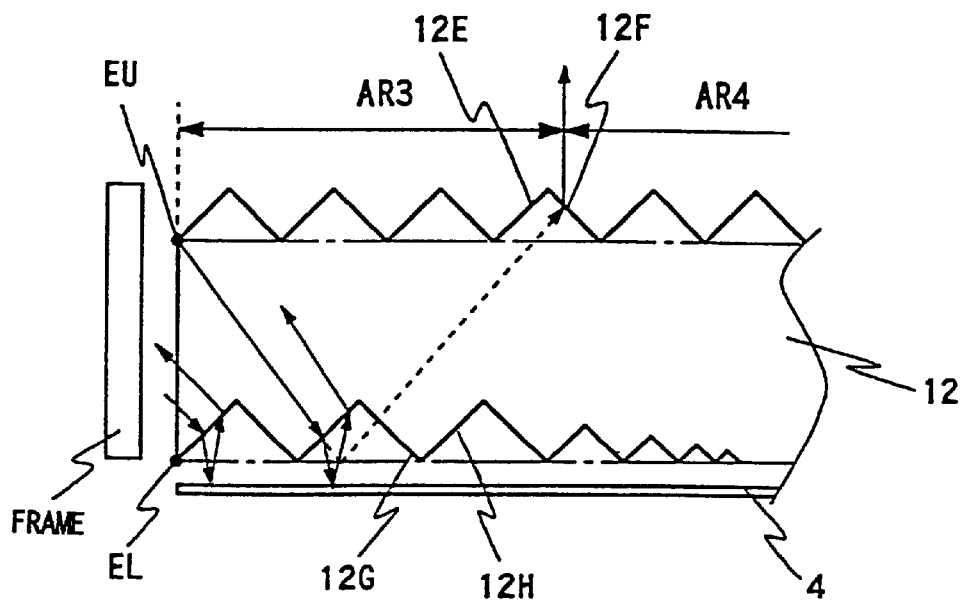
FIG. 5 is a diagram illustrating a function for preventing over-reflection of the scattering guide plate shown in FIG. 1.

Next, FIG. 5 is a diagram to explain this function for preventing quality reduction of light caused by frame-irradiation. In FIG. 5, light illuminating the frame thereafter passes between the edges EL and EU and through the side face, reaching the back face 12B.

If the back face 12B were flat, many components of light would be reflected off the back face 12B and the reflection sheet 4 and would proceed toward the emission surface 12C. This light is easily emitted from the emission surface 12C, comprising a prism surface. However, when projections (slopes 12G and 12H) exist, as in the present embodiment, light path changes.

That is, many of light components arriving from the edge EU pass through the back face 12B and reflect off the reflection sheet 4. From the back face 12B, the reflected light then proceeds once again through the guide plate 12. Light path during this process is bent due to refraction action of the slope 12H. As is the case with illuminating light arriving from the edge EU, there is a spread in the arrival path of light from the frame.

Therefore, as in light arriving from the edge EU, we can expect diffusion into a great number of directions to occur in accordance with incidence angle to the slopes 12G and 12H of the back face 12B. If the back face 12B were flat, we could not expect such diffusion into a great number of directions.

Further, since the height of the projections decreases according to distance from the side face, the above light diffusion function tends to be weaken as distance from the side face increases. This matches the general tendency of bright lines being less likely to be generated as distance from the side face increases.

Furthermore, (i) components of illuminating light which arrive at the emission surface 12C directly from the lower edge EL and (ii) light, illuminating the frame, which is not reflected from the back face 12B and consequently arrives directly at the emission surface 12C are both caused by a reduction in the slopes 12G and 12H formed on the back face 12B. These can be observed as increases in bright lines and emission intensity. However, overall, the action described above noticeably prevents generation of bright lines.

(2) Modifications

The scope of the present invention is not limited to the embodiment described above. For instance, the following modifications are also permissible.

Figure 6:
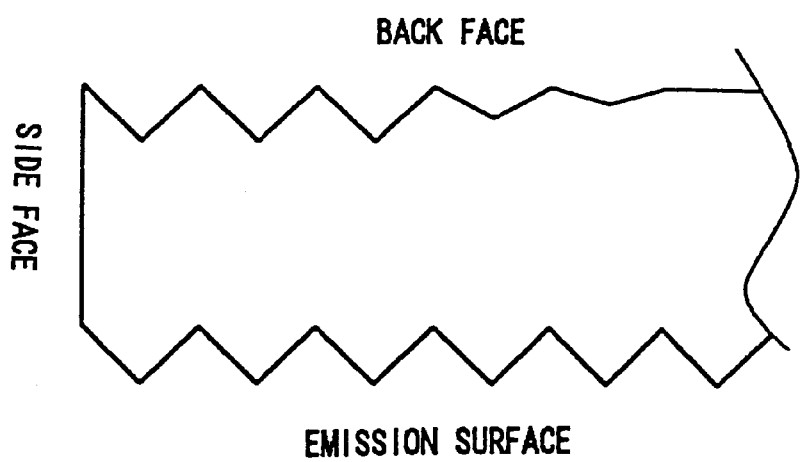
FIG. 6 is a partially sectional view of a scattering guide plate used in another embodiment of the present invention.

(a) The gradient of light diffusion function of the projections provided in region AR1 may be set in a manner other than changing the height of the projections. As shown in FIG. 6, for instance, the inclination of the slopes may be gradually reduced. In this case also, the boundary between the inside and outside of the region AR1 is, of course, obscured.

Figure 7:
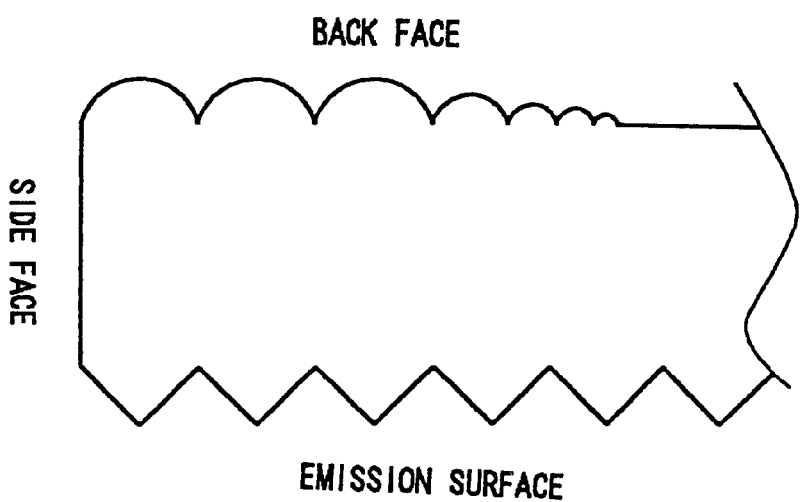
FIG. 7 is a partially sectional view of a scattering guide plate used in yet another embodiment of the present invention.

(b) In the above embodiment, the pairs of slopes 12G and 12H of the projections provided in the region AR1 were directly connected, so that the projections were triangular when viewed in cross-section. However, the present invention is not limited to this. For instance, the pairs of slopes may be connected via a circular arc. Or, as shown in FIG. 7, the projections may be made circular-arc-shaped in cross-section while consecutively changing each pair of slopes.

(c) In the above embodiment, the angle formed by a pair of slopes (top angle) was 100 degrees. However, this is merely one example of projection sharpness. Generally, the sharpness of the projections may be set according to design in compliance with conditions such as thickness of the guide plate.

(d) In the above embodiment, the projections were depicted at a pitch of 50 $\mu$m. However, this is merely one example. Generally, the pitch of the projections can be set according to design.

(e) In the above embodiment, the diffusion sheet 6 was provided on the outer surface of the prism sheet 5. However, where necessary, the diffusion sheet 6 may for instance be provided to the inner surface of the prism sheet 5. A diffusion sheet is omitted on a case-by-case basis.

(f) Generally, a non-flexible prism sheet, or a plate-like light control member (namely, a prism body) may be used instead of a flexible prism sheet.

(g) In the above embodiment, a light-scattering guide plate was used as the guide plate. However, light-scattering guide plate can be replaced with a light-permeable guide plate. Furthermore, there is no limit on the material or manufacturing method of light-scattering guide plate.

(h) The cross-sectional shape of the guide plate does not have to be wedge-shaped. For instance, a guide plate of even thickness may be used.

(i) Two or more end surfaces of the guide plate may be used as incidence surfaces. Multiple primary light sources may be provided according to therewith.

(j) The above embodiment used a guide plate having a prism surface provided on the emission surface thereof. However, the present invention is not limited to this. The present invention can also be applied when using a guide plate having a flat emission surface or a mat surface.

(k) The surface light source device of the present invention may be applied for uses other than backlighting in a liquid crystal display. For instance, the present invention may be widely applied to various illuminating equipment and displays.

What is claimed is:

1. A surface light source device of side light type comprising a primary light source and a guide plate, having an emission surface and a back face as major surfaces, said guide plate further comprising an incidence end surface, for receiving light supplied from said primary light source, and two side faces adjoining said incidence end surface, said back face and said emission surface, said back face and said the respective side faces meeting so as to form two edges; wherein a plurality of projections are provided on said back face only in regions located along the respective edges, said projections being formed by sloped surface portions meeting along edges that each run generally parallel to the respective edges where said back face and one of said side faces meet.

2. A surface light source device of side light type comprising a primary light source and a guide plate, having an emission surface and a back face as major surfaces, said guide plate further comprising an incidence end surface, for receiving light supplied from said primary light source, and two side faces adjoining said incidence end surface, said back face and said emission surface, said back face and the respective side faces meeting so as to form two edges; wherein a plurality of projections are provided on said back face only in regions located along the respective edges, said projections being formed by sloped surface portions meeting along edges that each run generally parallel to the respective edges where said back face and one of said side faces meet; and a great number of projections, running generally perpendicular to said incidence end surface, are provided on said emission surface.

3. The surface light source device of side light type according to claims 1 or 2, wherein projections, provided in said region on said back face, decrease in height as distance from said edge increases.

4. The surface light source device of side light type according to claims 1 or 2, wherein projections, provided in said region on said back face, decrease in sharpness as distance from said edge increases.

* * * * *